Aug. 18, 1936.　　　D. M. DOW　　　2,051,203
SUCTION CLEANER
Filed May 19, 1933　　　2 Sheets-Sheet 1

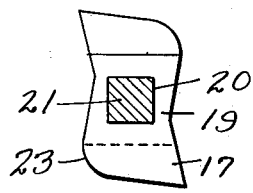 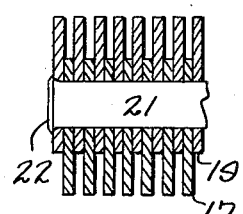 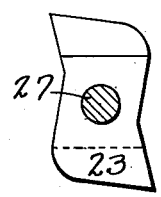 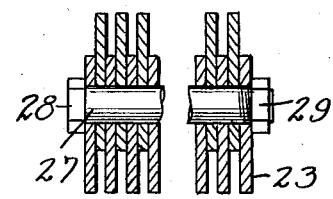
Fig. 3　　Fig. 4　　Fig. 5　　Fig. 6
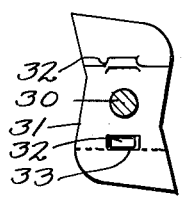 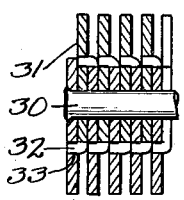 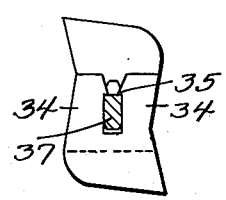 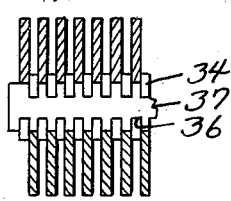
Fig. 7　　Fig. 8　　Fig. 9　　Fig. 10
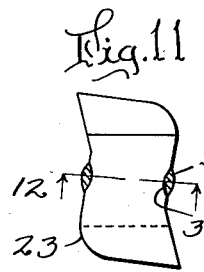 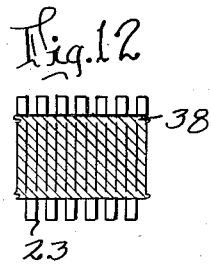
Fig. 11　　Fig. 12
Inventor
Dewey M. Dow
By Lynn H. Latta
Attorney Aug. 18, 1936.  D. M. DOW  2,051,203
SUCTION CLEANER
Filed May 19, 1933  2 Sheets-Sheet 2
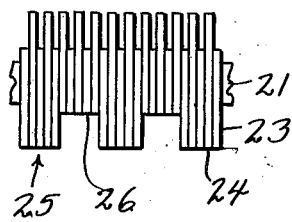
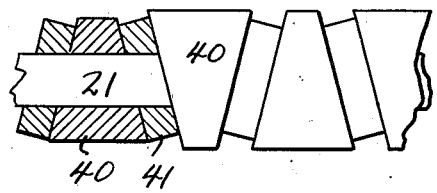
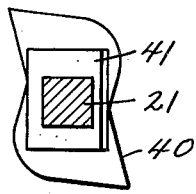
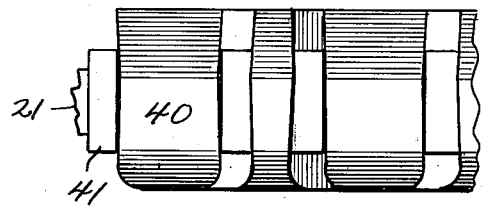
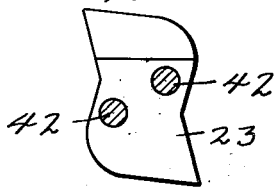
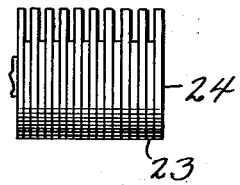
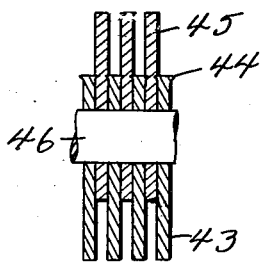

Patented Aug. 18, 1936

2,051,203

UNITED STATES PATENT OFFICE 2,051,203

SUCTION CLEANER

Dewey M. Dow, Toledo, Ohio, assignor to Air-Way Electric Appliance Corporation, Toledo, Ohio, a corporation of Delaware Application May 19, 1933, Serial No. 671,927

3 Claims. (Cl. 15—157)

This invention relates to suction cleaner floor tools. One of my objects is to improve the strength and ruggedness of the fine comb teeth of an agitator such as that disclosed in pending applications Serial Nos. 651,584 and 663,780. Such agitators are preferably made of hard fibre material, metal being objectionable to many users.

Another object is to decrease the expense of making such agitators.

To accomplish these objects, my invention contemplates the forming of the teeth individually from sheet stock, by a blanking operation in a punch press, stacking them between alternately arranged spacers, with their working portions projecting beyond said spacers, spaced thereby, and aligned parallel to an axis perpendicular to the faces of the teeth, which axis forms the longitudinal axis of the agitator, and securing them together in such stacked relation.

Another object is to provide an agitator in the general shape of a long narrow bar, which is very flexible so as to readily adapt itself to a holding socket in the floor tool nozzle, which will not warp under weather influence, as will agitators cut from solid bars of fibre material, and which is relatively unbreakable across its longitudinal axis.

To this end, the invention contemplates stringing the tooth blanks upon a metal rod, which forms the backbone of the agitators.

With these and other objects in view my invention consists in the combination and construction and arrangement of the various parts thereof, whereby the objects contemplated are attained, as more fully set forth in the accompanying specifications, pointed out in my claims, and illustrated in the accompanying drawings, in which:

Fig. 3 is a transverse sectional view through the agitator.

Fig. 4 is a longitudinal sectional view through a portion of the agitator.

Fig. 5 is a view similar to Fig. 3 of a modified form of the agitator.

Fig. 6 is a longitudinal sectional view of the same.

Fig. 7 is a view similar to Fig. 3 of a further modification of the invention.

Fig. 8 is a longitudinal sectional view of the same.

Fig. 9 is a view similar to Fig. 3 of another modification of the invention.

Fig. 10 is a longitudinal sectional view of the same.

Fig. 11 is a view similar to Fig. 3 of another modification of the invention.

Fig. 12 is a longitudinal sectional view of the same.

Fig. 13 is an elevational view of a portion of another modified form of the invention.

Fig. 14 is a plan view of another modification of the invention.

Fig. 15 is a transverse sectional view of the same.

Fig. 16 is an elevational view of the same.

Fig. 17 is a transverse sectional view of another modified form of the invention.

Fig. 18 is an elevational view of another modification of the invention, and

Fig. 19 is a longitudinal sectional view of another modification of the invention.

Figure 1:
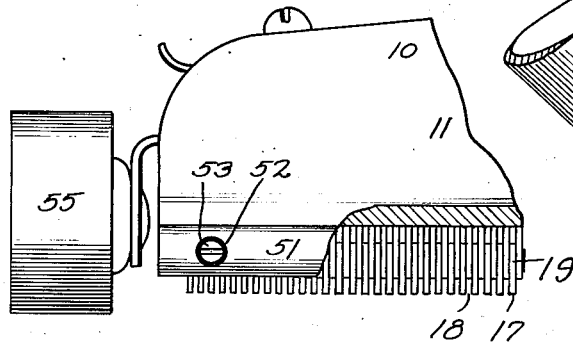
Fig. 1 is a front elevation of one end of a floor tool embodying the invention.
Figure 2:
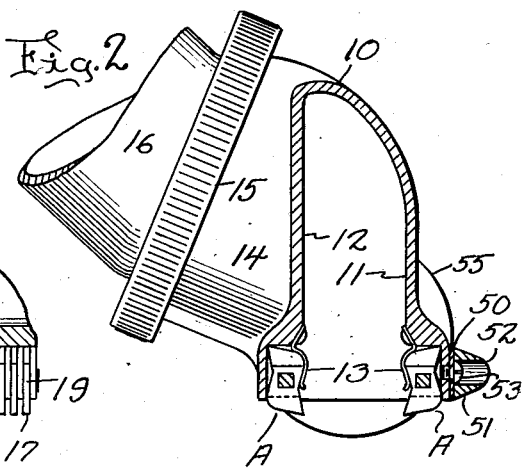
Fig. 2 is a transverse sectional view thereof.

In Figs. 1 and 2 I have illustrated a floor tool comprising a shell 10 having forward and rear walls 11 and 12, formed at their lower edges with resilient sockets 13 such as is more fully illustrated in application Serial No. 663,780, and a neck 14 which is attached by means of a swivel union 15 to the suction tube 16 of the cleaner.

Each socket 13 holds a lip agitator A, the two agitators cooperating to define the suction mouth of the floor tool.

Greatest pick-up efficiency is attained by forming the agitators with closely spaced, thin, flat, wide teeth 17, defining between them air channels 18 through which a large number of fine jets of air are drawn into the floor tool, penetrating the nap of the carpet to lift dust particles, and carrying into the tool the particles of lint, hairs, etc., combed up by the teeth.

Such teeth can be successfully cut into a plain bar of fibre material by a gang of milling cutters. But a large number of such cutters are necessary, they have to be resharpened and replaced often, and they are quite expensive.

The teeth when thus formed are found to have ample strength and great wearing qualities in service, contrary to expectations previous to the original conception of such an agitator, but they can be broken if used as a fulcrum against which to rest a screw driver for prying an opposite agitator from its socket in the floor tool.

According to the present invention, the teeth are blanked from a sheet of fibre in which the grain runs parallel to the face of the sheet, and are thus given maximum strength against breakage. Each blank includes the tooth 17 and a spacer portion 19 the latter, in the preferred form of the invention, being perforated with a non-circular opening 20 to receive the supporting rod 21 shaped cross sectionally to snugly fit the opening 21.

The teeth are strung onto the rod 21 and the ends of the latter upset or swaged to form heads 22 to secure the assembled teeth into a rigid unit in the form of an elongated bar adapted to be received in the hocket 13.

In the preferred forms of the invention the portion 19 of each tooth forms a spacer for the working portions of the two adjoining teeth, this being achieved by forming the tooth so that the working portion 17 projects farther from the opening 20 than does the spacer portion 19, and arranging the teeth with the working portion alternately projecting in opposite directions.

The teeth are somewhat larger toward their outer extremities, so that one working portion of the agitator may dove tail into the socket 13 while the other is presented in an operative position.

The tooth consisting of the members 17, 19, will be hereinafter referred to, as a whole by the reference numeral 23.

If it is desired to provide an agitator with a smooth faced working portion, the alternate teeth 24 may be made the full cross sectional shape of the agitators as shown in Fig. 18.

An agitator with thick lugs 25 on one side, (Fig. 13) may be constructed by using two types of teeth, the two already described, and the third, a simple spacer 25 without a tooth.

The teeth may be strung upon a round rod 27 (Fig. 5) properly aligned in a jig, and clamped in position by pressure developed between a head 28 and a threaded nut 29 on the respective ends of the rod, creating friction between the contacting faces of the teeth.

A round rod 30 may be employed, (Fig. 7) and the teeth 31 provided with extruded portions 32 receivable in recesses 33 in adjacent teeth, to prevent rotation from proper assembled positions.

The teeth may be provided (Fig. 9) with spacer portions comprising spaced opposed arms 34 having hooks 35 hooking into a notch 36 of a holding strip 37 embraced by the arms 34. The notches 36 are alternately arranged so that one blank may embrace the strip 37 from one side and engage a notch on the opposite side, while the adjoining blanks embrace the strip from the latter side and engage in notches on the former side.

An advantage of the invention not heretofore mentioned, is the possibility of alternating fibre teeth and metal teeth, so as to produce a fibre-toothed comb on one side of the agitator and a metal-toothed comb on the other side.

The teeth may be held together by rods 38 welded to the edges of the metal teeth and engaging depressions 39 in the fibre teeth, or, if it is desired to employ all metal teeth, the rods 38 may be formed by simply welding together the edges of the teeth along lines parallel to the longitudinal axis of the agitator.

Instead of flat teeth, triangular shaped teeth 40 may be employed (Fig. 14) to produce triangular lugs on the working faces of the agitators. Such teeth may be perforated as shown and spaced by washers 41.

Two rods 42 may be employed instead of the non-circular rod 21 (Fig. 17).

Metal teeth 43 with burred edges 44 may be alternated with fibre teeth 45 (Fig. 19), the burred edges 44 serving to prevent rotation around the single round holding rod 46.

The holding rod provides strength against breakage of the agitator across its axis.

The teeth may be made very cheaply in a multiple blanking die, and assembled by feeding them onto the holding rod, an operation that may easily be made automatic.

In forming an agitator of the shape illustrated, from a single bar of material, it is necessary to mill the rough bar on all sides longitudinally to secure the proper cross-sectional shape. Thence it must be cross milled to produce the teeth on its respective sides, it being necessary to mill each side separately.

The present invention eliminates all of these milling operations. The resultant product is cheaper, has a much greater ratio of combined strength and flexibility, and has teeth of greater individual strength.

The floor tool is provided with a bumper comprising a steel strip 50, plated on one side with a brass surface, and a cushion 51 of rubber bonded to the brass surface under pressure to produce a permanent union. Openings 52 in the cushion 51, coaxial with smaller openings in the strip 50, accommodate the heads of screws 53 which are extended through the openings in the strip 50 and threaded into the floor tool 10.

The strip 50 is sufficiently soft to conform to the forward surface of the floor tool. The screws 53 draw it tightly against the said surface.

The screws are recessed in the cushion 51 the full depth thereof so as to be protected from contact with baseboards, furniture, etc.

The bumper extends only across the front face of the floor tool, the rollers 55, also of soft rubber, providing protection against the ends of the floor tool. Thus the three sides of the floor tool which are apt to damage woodwork, are fully protected.

I claim as my invention:

1. A lip agitator for a suction cleaner of the type having a lip socket for holding said agitator comprising a plurality of teeth stacked together, face to face, non-contiguous teeth projecting beyond the intervening teeth to form working portions, and at least some of the teeth having their regions beyond the axis of the agitator opposite the working portions shaped so as to be wider at their outer extremities than intermediate their ends, so as to be securely retained in said socket, and means for securing said teeth together.

2. A lip agitator for a suction cleaner of the type having a lip socket for holding said agitator comprising a plurality of teeth stacked together, face to face, non-contiguous teeth projecting beyond the intervening teeth to form working portions, and at least some of the teeth having their regions beyond the axis of the agitator opposite the working portions shaped so that their socket engaging edges diverge away from the agitator axis, so as to be securely retained in said socket, while said working portions are engaging a carpet, and means for securing said teeth together.

3. A lip agitator for a suction cleaner of the type having a lip socket for holding said agitator comprising a plurality of teeth stacked together, face to face, non-contiguous teeth projecting beyond the intervening teeth to form working portions, and at least some of the teeth having their regions beyond the axis of the agitator opposite the working portions shaped so that their socket engaging edges diverge away from the agitator axis, so as to be securely retained in said socket, while said working portions are engaging a carpet, and means for securing said teeth together comprising a rod extending through said teeth.

DEWEY M. DOW.